(12) United States Patent
Fujikawa et al.

(10) Patent No.: US 8,033,032 B2
(45) Date of Patent: Oct. 11, 2011

(54) INSIDE DIAMETER MEASURING TOOL

(75) Inventors: Yuji Fujikawa, Kure (JP); Masahiko Tachikake, Kure (JP); Kouji Matsumoto, Kure (JP); Shuji Hayashida, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 9 days.

(21) Appl. No.: 12/501,806

(22) Filed: Jul. 13, 2009

(65) Prior Publication Data

US 2010/0005676 A1    Jan. 14, 2010

(30) Foreign Application Priority Data

Jul. 14, 2008  (JP) .................. 2008-182569

(51) Int. Cl.
G01B 3/18 (2006.01)
G01B 5/12 (2006.01)
(52) U.S. Cl. .............. 33/542; 33/813; 33/815
(58) Field of Classification Search .......... 33/542, 33/813, 815
See application file for complete search history.

(56) References Cited

U.S. PATENT DOCUMENTS

| 1,439,989 A | * | 12/1922 | Ekman et al. | 33/542 |
|---|---|---|---|---|
| 1,656,180 A | * | 1/1928 | Eisele | 33/542 |
| 2,454,246 A | * | 11/1948 | Worthen | 33/542 |
| 2,456,497 A | * | 12/1948 | Forsmark | 33/542 |
| 2,788,582 A | * | 4/1957 | Middeler | 33/542 |
| 2,822,622 A | * | 2/1958 | Meyer | 33/542 |
| 2,881,529 A | * | 4/1959 | Roch | 33/544.6 |
| 3,486,235 A | * | 12/1969 | Hilfiker et al. | 33/542 |
| 4,536,963 A | | 8/1985 | Yamamoto et al. | |
| 4,873,768 A | | 10/1989 | Van Sickle et al. | |
| 5,377,421 A | * | 1/1995 | Isler | 33/542 |
| 6,370,786 B2 | * | 4/2002 | Ishii | 33/501.12 |
| 2005/0274034 A1 | * | 12/2005 | Hayashida et al. | 33/813 |

FOREIGN PATENT DOCUMENTS

| DE | 368494 | 2/1923 |
|---|---|---|
| DE | 216974 | 12/2009 |
| JP | 48-78866-01 | 12/1946 |
| JP | 60-41811 | 3/1985 |

* cited by examiner

*Primary Examiner* — Christopher Fulton
(74) *Attorney, Agent, or Firm* — Rankin, Hill & Clark LLP

(57) ABSTRACT

An inside diameter measuring tool includes: a main body; an axially moving spindle having a male screw to be screwed to the main body; a plurality of contact pieces provided on the main body, the measuring pieces moving in a direction substantially orthogonal to the axial direction of the spindle; and a conical member interposed between the contact pieces and the spindle, the conical member advancing and retracting the contact pieces in the direction substantially orthogonal to the axial direction of the spindle. The lead of the male screw of the spindle is 1.0 mm or more and the cone angle of the conical member is less than 53 degrees. Preferably, the lead of the male screw is 2.0 mm and the cone angle of the conical member is approximately 28 degrees.

1 Claim, 2 Drawing Sheets

INSIDE DIAMETER MEASURING TOOL

The entire disclosure of Japanese Patent Application No. 2008-182569, filed Jul. 14, 2008, is expressly incorporated by reference herein.

BACKGROUND OF THE INVENTION

1. Field of the Invention

The present invention relates to an inside diameter measuring tool.

2. Description of Related Art

An inside diameter measuring tool called as a Holtest has been known as a device for measuring an inner diameter of an object to be measured. The inside diameter measuring tool includes: a body; an axially moving spindle having a screw to be screwed to the body; a plurality of contact pieces provided on the body, the contact pieces advancing and retracting in a direction substantially orthogonal to the axial direction of the spindle; and a conical member interposed between the contact pieces and the spindle, the conical member moving the contact pieces in the direction substantially orthogonal to the axial direction of the spindle in accordance with the axial movement of the spindle (see, for instance, Document 1: JP-U-60-41811).

Typical inside diameter measuring tools are configured so that the lead of the screw provided on the spindle is 0.5 mm and the cone angle $\alpha$ of the conical member is approximately 53 degrees in order to equalize the displacement of the contact pieces and the displacement of the spindle. Specifically, displacement of one of the contact pieces is represented by (displacement of the spindle)$\times(\tan(\alpha\times\frac{1}{2})$. Since $\tan(53\times\frac{1}{2})$ is approximately equal to 0.5, the displacement of the contact pieces (total displacement of two contact pieces among the plurality of contact pieces) and the displacement of the spindle can be equalized.

However, since the lead of the screw of the spindle of the inside diameter measuring tool is 0.5 mm, when an operator measures objects of various size, he has to undergo a number of rotation of the screw of the spindle in order to advance and retract the contact pieces, resulting in deteriorated operability and operation efficiency.

One solution for the above problem is to enlarge the cone angle of the conical member. When, for instance, the cone angle is 90 degrees, the contact pieces can be advanced/retracted by approximately double distance even with the same number of rotation(s) of the spindle as that of the typical tool.

However, in accordance with the increase in the cone angle, the load on the slide surface of the contact pieces applied when the contact pieces slide on the conical surface of the conical member increases. Consequently, the frictional force caused on the portion on which the contact pieces slide on the conical member increases as compared with the typical arrangement, which is likely to deteriorate the durability of the contact pieces and the conical member. Further, the displacement of the spindle is transmitted to the contact pieces at the same ratio in the typical arrangement. However, when the cone angle of the conical member is increased, the displacement of the spindle is magnified when being transmitted to the contact pieces. In other words, the contact pieces is greatly displaced for a relatively small amount of displacement of the spindle, which lowers the measurement accuracy.

SUMMARY OF THE INVENTION

An object of the present invention is to provide an inside diameter measurement tool capable of enhancing the operability, operation efficiency and measurement accuracy when an object is to be measured while minimizing a frictional force caused between contact pieces and a conical member to enhance durability.

An inside diameter measurement tool according to an aspect of the invention includes: a main body; a spindle provided with a screw that is screwed with the main body, the spindle advancing and retracting in an axial direction thereof; a plurality of contact pieces provided on the main body, the contact pieces advancing and retracting in a direction substantially orthogonal to the axial direction of the spindle; and a conical member interposed between the contact pieces and the spindle, the conical member advancing and retracting the contact pieces in the direction substantially orthogonal to the axial direction of the spindle in accordance with the axial advancement and retraction of the spindle, in which a lead of the screw of the spindle is 1.0 mm or more and a cone angle of the conical member is less than 53 degrees.

According to the above aspect, since the lead of the screw of the axially advancing/retracting spindle is 1.0 mm or more, the axial feed amount of the spindle per one rotation of the spindle is increased as compared with a conventional arrangement. Thus, a large number of rotations of the screw are not necessary for measuring an object to be measured, thereby enhancing the work efficiency and operability.

Further, since the cone angle of the conical member is less than 53 degrees, the displacement of the contact pieces in the direction substantially orthogonal to the axial direction of the spindle per predetermined displacement of the spindle becomes small as compared to an arrangement employing a conical member with conical angle of 90 degrees. Further, the distance for which the contact pieces are in contact with the conical surface of the conical member increases to reduce the frictional force generated in the slide movement of the conical member and the contact pieces, thereby enhancing the durability.

In the inside diameter measurement tool according to the above aspect of the invention, the lead of the screw of the spindle may be 2.0 mm and the cone angle of the conical member may be approximately 28 degrees.

The above term "approximately 28 degrees" represents a value satisfying the formula of $\tan([\text{cone angle}]\times\frac{1}{2})=0.25$ (approximately 28.0724869 . . . degrees).

In a conventional arrangement of 0.5 mm lead and 53 degrees conical angle, two rotations of the spindle are required in order to displace the contact piece by 1.0 mm in the direction substantially orthogonal to the axial direction of the spindle. On the other hand, since the lead is 2.0 mm and the conical angle is approximately 28 degrees in the above arrangement, the spindle advances/retracts for 2.0 mm per one rotation thereof, in accordance with which one of the contact pieces is displaced for 0.5 mm ($2.0\times\tan(28\times\frac{1}{2})$). Considering two of the contact pieces function in pair, only one half rotation of the spindle is required for displacing the contact pieces for 1.0 mm. Thus, the contact piece can be displaced for 1.0 mm with a less number of rotation of the spindle than a conventional arrangement, so that work efficiency and operability can be enhanced. Further, the distance for which the contact pieces are in contact with the conical surface of the conical member increases to reduce the frictional force generated in the slide movement of the conical member and the contact pieces, thereby enhancing the durability.

DETAILED DESCRIPTION OF PREFERRED EMBODIMENT(S)

An exemplary embodiment of the invention will be described below with reference to the attached drawings.

Figure 1:
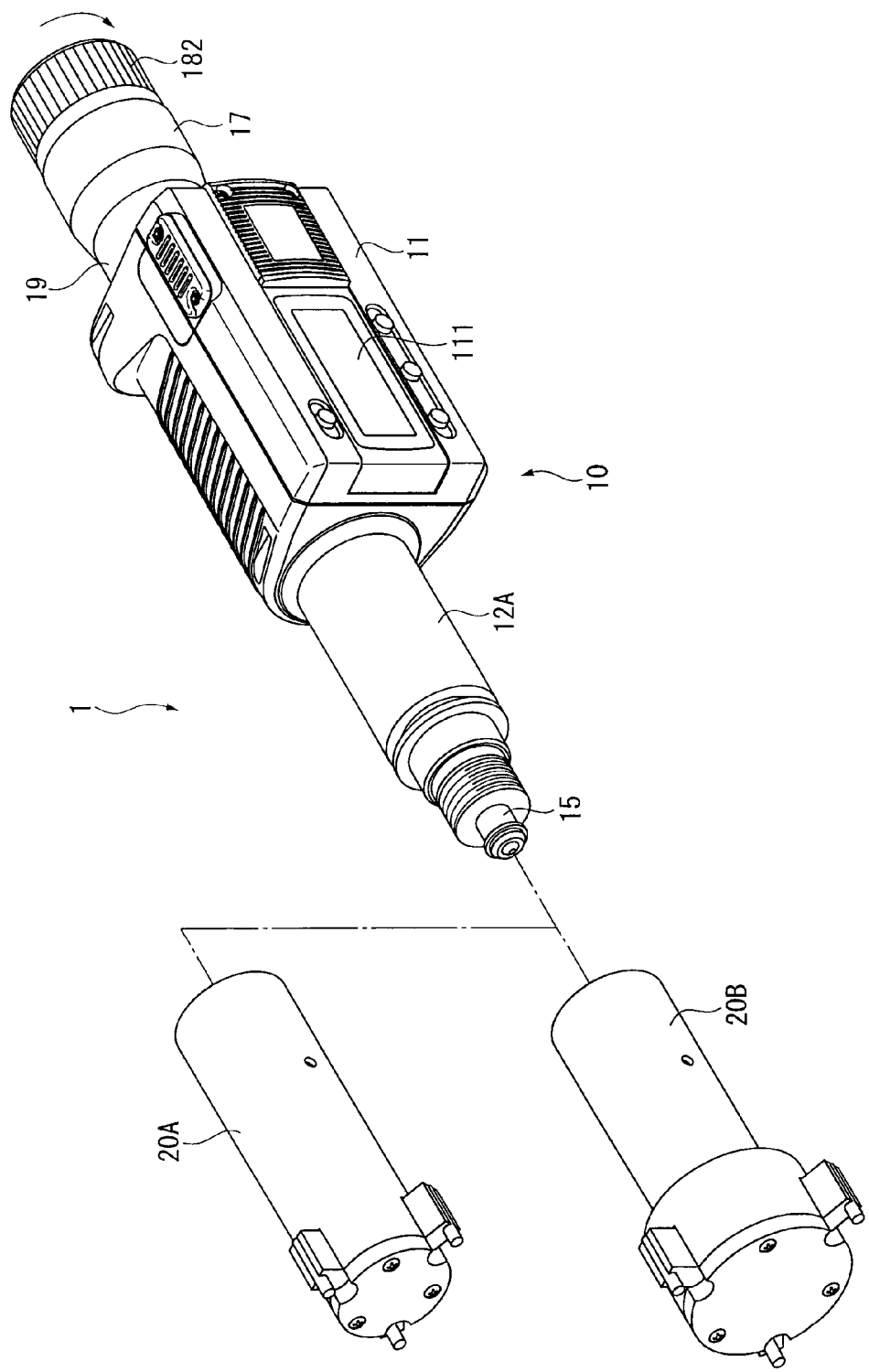
FIG. 1 is an exploded perspective view of a Holtest according to an exemplary embodiment of the invention.
Figure 2:
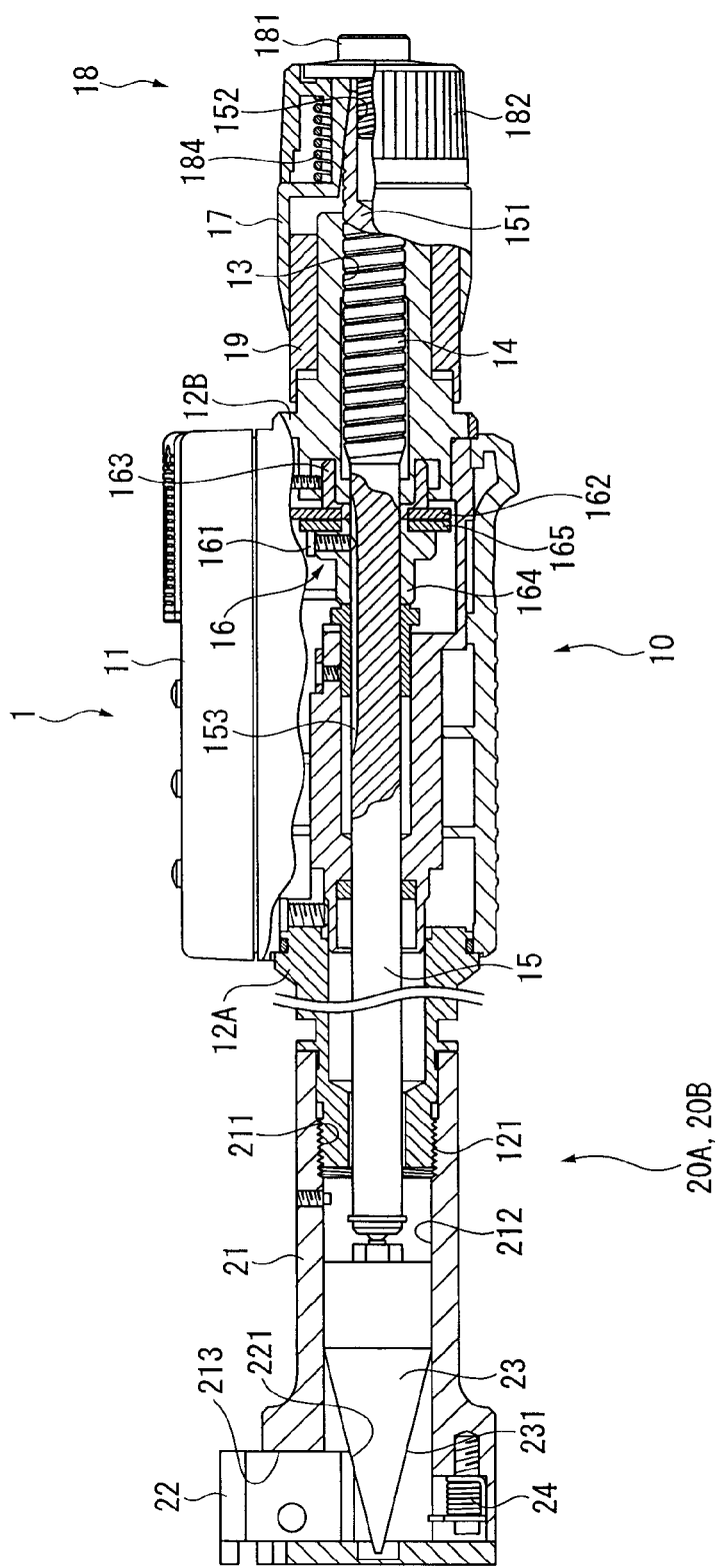
FIG. 2 is a cross section of the Holtest.

FIG. 1 is an exploded perspective view of a Holtest 1 (inside diameter measurement tool) according to this exemplary embodiment. FIG. 2 is a cross section of the Holtest 1.

As shown in FIG. 1, the Holtest 1 includes a main body 10 and a plurality of measuring heads 20A and 20B. The measuring heads 20A and 20B are exchangably used in accordance with an inner diameter of an object to be measured.

Arrangement of Main Body 10

The main body 10 includes: a rectangular case 11; a substantially cylindrical sleeves 12A, 12B coaxially attached on both sides of the case 11; a spindle 15 screwed with an inner circumference of the sleeve 12B, the spindle 15 advancing and retracting in an axial direction thereof; a detector 16 for detecting the axial displacement of the spindle 15; a thimble 17 for advancing and retracting the spindle 15; and a constant pressure mechanism 18 provided adjacent to a base end of the spindle 15, the constant pressure mechanism 18 allowing a free rotation of the thimble 17 against the spindle 15 when more than a predetermined load is applied on the spindle 15.

The case 11 is provided with a display unit 111 that digitally displays the axial displacement of the spindle 15 detected by the detector 16.

The sleeve 12A is provided with a male screw 121 with which one of the measuring heads 20A and 20B is screwed. An outer sleeve 19 is attached to an outer circumference of the sleeve 12B. A female screw 13 is provided on the inner circumference of the sleeve 12B. Graduations (not shown) are axially provided on the outer circumference of the outer sleeve 19.

A male screw 14 to be screwed with the female screw 13 of the sleeve 12B is provided on the spindle 15 adjacent to the base end thereof. A tapered section 151 is provided on the spindle 15 further adjacent to the base end. The lead of the male screw 14 is 2.0 mm.

An engaging groove 153 is axially provided approximately at an axial center of the spindle 15.

The thimble 17 is fitted onto the tapered section 151 from the base end of the spindle 15 so that the thimble 17 covers the outer sleeve 19. Graduations (not shown) that represent displacement of the spindle 15 in conjunction with the graduations of the outer sleeve 19 are circumferentially provided on the outer circumference of the thimble 17. A screw hole 152 is provided inside the tapered section 151.

The detector 16 includes a so-called rotary encoder having a stator 162, a stator bushing 163, a rotor bushing 164 and a rotor 165, and a processor (not shown) for calculating the displacement of the spindle 15 based on an output signal of the rotary encoder and converting the displacement into the displacement of the below-described contact pieces.

The stator 162 is penetrated by the spindle 15 via the stator bushing 163 to be fitted and rigidly secured on an end of the sleeve 12B.

The rotor bushing 164 is penetrated by the spindle 15 and is provided with an engaging pin 161 to be engaged with the engaging groove of the spindle 15, so that the rotor bushing 164 is rotated integrally with the spindle 15.

The rotor 165 is penetrated by the spindle 15 and is engaged with the rotor bushing 164 to be rotated integrally with the rotor bushing 164. The rotor 165 outputs a relative angle signal indicating an angle of the rotor 165 relative to the stator 162.

The processor (not shown) calculates the rotation of the spindle 15 based on the relative angle signal outputted by the rotor 165 to calculate the displacement of the spindle based on the rotation of the spindle 15 and the lead of the male screw 13. The displacement of the spindle 15 calculated by the processor is digitally displayed on the display unit 111 after being converted into the displacement of the contact pieces, as described above.

The constant pressure mechanism 18 transmits the rotation of the thimble 17 to the spindle 15 while allowing a free rotation of the thimble 17 against the spindle 15 when more than a predetermined load is applied on the spindle 15 to provide a constant measurement pressure. The constant pressure mechanism 18 includes: a shaft 181 screwed with the screw hole 152; a ratchet sleeve 182 rotatably supported on an outer circumference of the thimble 17; and a coil spring 184 that biases the ratchet sleeve 182 toward the shaft 181.

When the ratchet sleeve 182 is rotated, since the ratchet sleeve 182 is biased toward the shaft 181 by virtue of the coil spring 184, the thimble 17 is also rotated. On the other hand, when more than a predetermined load is applied on the spindle 15, the ratchet sleeve 182 is freely rotated against the shaft 181, so that the measurement can be conducted under a constant pressure.

Arrangement of Measuring Heads 20A and 20B

Each of the measuring heads 20A and 20B includes: a bottomed cylindrical head body 21; a plurality of contact pieces 22 attached to an end of the head body 21; and a conical member 23 disposed inside the head body 21.

The head body 21 is provided with: a female screw 211 to be screwed with the male screw 121 of the sleeve 12A; a housing bore 212 that allows advancement and retraction of the conical member 23 along an axial direction of the head body 21; and openings 213 for advancing and retracting the contact pieces 22 in a direction substantially orthogonal to the axial direction of the spindle 15. The openings 213 are provided on the distal end of the head body 21 at every 120 degrees interval.

The contact pieces 22 are slidably disposed in the openings 213 to be advanced and retracted in the direction substantially orthogonal to the axial direction of the spindle 15. Further, the contact piece 22 is biased toward the conical member 23 by the coil spring 24.

The conical member 23 is accommodated within the housing bore 212 of the head body 21 in a manner capable of axial advancement and retraction and is in contact with the distal end of the spindle 15. A chamfered portion 221 provided on each of the contact pieces 22 is brought into contact with the conical surface 231 of the conical member 23. The cone angle of the conical member 23 is approximately 28 degrees.

Operation of Holtest 1

When an operator rotates the ratchet sleeve 182 in a feed direction (in a direction indicated by an arrow in FIG. 1), the ratchet sleeve 182 is biased by the coil spring 184 toward the shaft 181 to be rotated together with the thimble 17 and, consequently with the spindle 15. When the male screw 14 of the spindle 15 is screwed with the female screw 13 of the sleeve 12B, the spindle 15 is moved toward the conical member 23 along the axial direction thereof. Then, the spindle 15 presses the conical member 23. Since the contact pieces 22 are in contact with the conical surface 231 of the conical member 23, the contact pieces 22 are moved in a direction substantially orthogonal to the axial direction against the biasing force of the coil spring 184 to be abutted to an inner circumference of an object to be measured.

On the other hand, when the ratchet sleeve 182 is further rotated in the feed direction after the contact piece 22 is abutted to the inner circumference of the object, since the spindle 15 cannot be further advanced, more than a predetermined load is applied on the spindle to freely rotate the ratchet sleeve 182 against the shaft 181. Accordingly, the object can be measured with the constant pieces 22 at a constant measurement pressure, thereby avoiding variation in the measurement value among operators.

Incidentally, though the ratchet sleeve 182 is initially rotated in the above-described operations, the ratchet sleeve 182 may be rotated for attaining the constant measurement pressure after rotating the thimble 17.

According to the above exemplary embodiment, following advantages can be obtained.

When the spindle 15 is rotated one revolution, the spindle 15 with 2.0 mm lead is axially displaced for 2.0 mm. Since the cone angle of the conical member 23 is approximately 28 degrees, the contact piece 22 is displaced in radial direction of the conical member 23 for 0.5 mm (total 1.0 mm for a pair of contact pieces 22). In a conventional tool having 0.5 mm lead and 53 degrees cone angle, two rotations are required for displacing the contact piece 22 for 1.0 mm in a radial direction of the cone member 23. However, only one rotation of the spindle 15 is required for 1.0 mm displacement of the contact piece 22 in the radial direction of the conical member 23 in the above exemplary embodiment, so that the operability and work efficiency can be enhanced.

Further, the lead of the spindle 15 is 2.0 mm (four times larger than a conventional tool). When 2.0 mm lead is applied in a conventional tool with 53 degrees cone angle, the displacement transmitted to the contact pieces 22 becomes four times greater than that of the tool with 0.5 mm lead causing 2.0 mm displacement of the contact pieces 22 in the radial direction of the conical member 23. Accordingly, a measurement error can occur in the conventional arrangement with 53 degrees cone angle. However, since the cone angle is approximately 28 degrees in the above exemplary embodiment, the displacement transmitted to the contact pieces 22 can be restrained to a degree two times larger than the displacement of the spindle, so that the measurement accuracy can be enhanced.

Since the cone angle is approximately 28 degrees, the slide displacement of the contact pieces 22 on the conical surface 231 of the conical member 23 becomes larger than the conventional arrangement, whereby the frictional force can be reduced. Accordingly, the abrasion on the conical member 23 and the contact piece 22 can be restrained, thereby enhancing the durability.

Incidentally, though an exemplary embodiment has been described above, it should be appreciated that the scope of the present invention is not limited thereto. In other words, while the invention has been particularly explained and illustrated mainly in relation to a specific embodiment, a person skilled in the art could make various modifications in terms of shape, quantity or other particulars to the above described embodiment without deviating from the technical idea or any object of the present invention.

Accordingly, any descriptions of shape or quantity or the like disclosed above are given as examples to enable easy understanding of the invention, and do not limit the present invention, so that descriptions using names of components, with any such limitations of shape or quantity or the like removed in part or whole, are included in the present invention.

In the above exemplary embodiment, the lead of the male screw 14 is 2.0 mm and the cone angle of the conical member 23 is approximately 28 degrees. However, the lead and the conical member can be set as desired in accordance with the specific application, structure of the inside diameter measurement tool and the demand for quick feed as long as excessive increase in the friction against the slide surface on the conical member and the displacement of the spindle 15 can be accurately and easily converted into the displacement of the contact pieces 22.

Though the detector 16 includes an electrostatic encoder, any encoder such as optical encoder and electromagnetic encoder may be provided on the detector 16 as long as the rotation of the spindle 15 can be detected.

Though the Holtest 1 is a digital Holtest in the above exemplary embodiment, analog Holtest may alternatively be used.

Though the male screw 14 of the above exemplary embodiment is provided by a single thread, a multiple thread may alternatively be used.

What is claimed is:

1. An inside diameter measurement tool, comprising:
a main body;
a spindle provided with a screw that is screwed with the main body, the spindle advancing and retracting in an axial direction thereof;
a plurality of contact pieces provided on the main body, the contact pieces advancing and retracting in a direction substantially orthogonal to the axial direction of the spindle;
a conical member interposed between the contact pieces and the spindle; and
a coil spring that biases the plurality of contact pieces toward a conical surface of the conical member,
wherein the lead of the screw of the spindle is 2.0 mm and the cone angle of the conical member is approximately 28 degrees, and
the coil spring is disposed so that an axial direction of the coil spring is substantially parallel to the axial direction of the spindle.

* * * * *